United States Patent [19]

Dahle et al.

[11] 4,088,013
[45] May 9, 1978

[54] MAGNETO-ELASTIC TRANSDUCER

[75] Inventors: Orvar Dahle; Folke Von Knorring; Jan Nordvall; Sture Siby, all of Vesteras, Sweden

[73] Assignee: ASEA Aktiebolag, Vesteras, Sweden

[21] Appl. No.: 739,806

[22] Filed: Nov. 8, 1976

Related U.S. Application Data

[63] Continuation of Ser. No. 633,844, Nov. 20, 1975, abandoned.

[30] Foreign Application Priority Data

Nov. 22, 1974 Sweden .............................. 7414683

[51] Int. Cl.² .............................................. G01L 5/00
[52] U.S. Cl. ............................... 73/141 A; 73/DIG. 2
[58] Field of Search .................. 73/141 A, DIG. 2; 336/212, 20, 83

[56] References Cited

U.S. PATENT DOCUMENTS

| | | | |
|---|---|---|---|
| 2,895,332 | 7/1959 | Dahle et al. ..................... | 73/141 A |
| 3,356,977 | 12/1967 | Ohlsson ............................ | 73/141 A |
| 3,379,053 | 4/1968 | Berglund et al. ................ | 73/DIG. 2 |
| 3,469,440 | 9/1969 | Löfgren ............................ | 73/DIG. 2 |
| 3,498,124 | 3/1970 | Soulant ............................ | 336/20 |
| 3,613,442 | 10/1971 | Bielsten .......................... | 73/181 A |
| 3,742,759 | 7/1973 | Nishimura ........................ | 73/141 A |
| 3,782,187 | 1/1974 | Dahle ............................... | 73/141 A |
| 3,861,203 | 1/1975 | Dahle et al. ..................... | 73/DIG. 2 |

Primary Examiner—Anthony V. Ciarlante
Attorney, Agent, or Firm—Watson, Cole, Grindle & Watson

[57] ABSTRACT

A transducer for magneto-elastic stress measurement is formed of a holder and a core of magneto-elastic material provided with coils to generate a flux in and sense flux alterations produced by stresses of the core. The core is formed of one or more plates firmly attached to the holder and designed to be attached to the measuring object. The core may consist of a single plate attached to the holder at four symmetrical points, or of a cross having four arms the ends of which are welded to a frame of magnetic material which is secured to the holder. The holder may also be in the form of a casing of magnetic material which protects the core and coils and serves as a magnetic return path for the fluxes. For applications where disturbing magnetic fields may occur in the measuring object, the casing is preferably made of non-magnetic material and provided with a frame of magnetic material as a return path for the flux.

8 Claims, 18 Drawing Figures

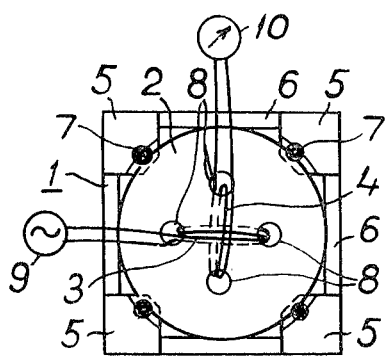
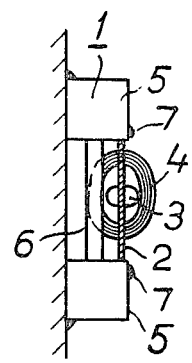
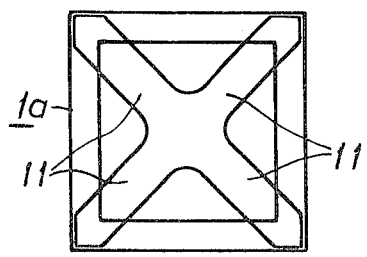
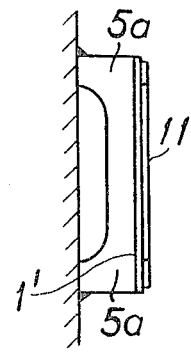
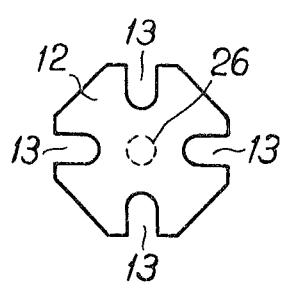
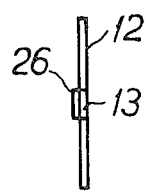
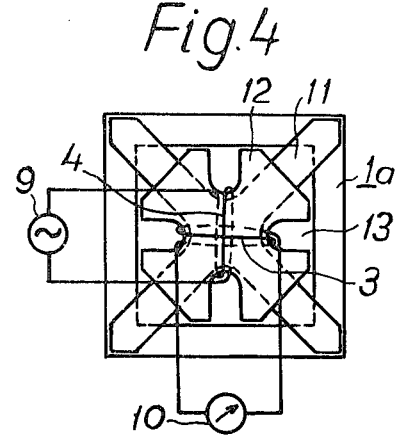

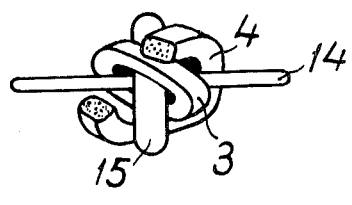
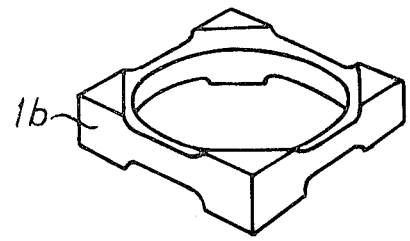
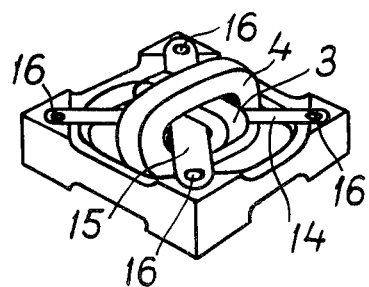
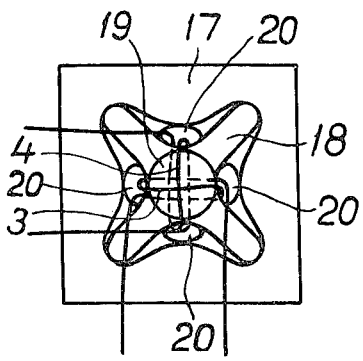
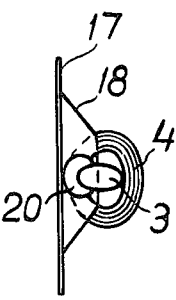
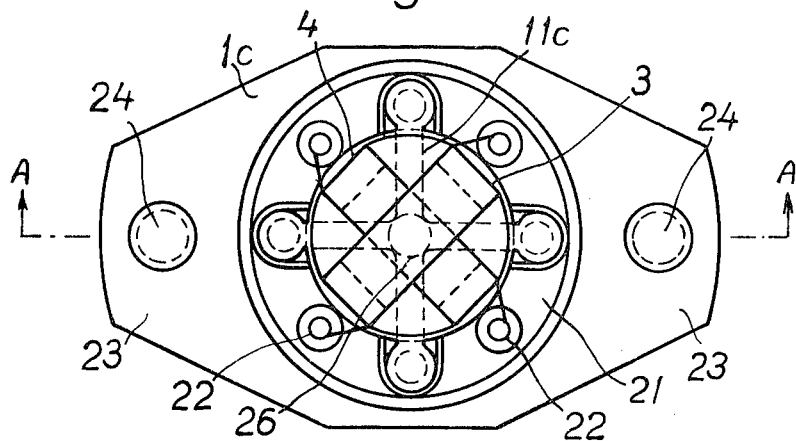

MAGNETO-ELASTIC TRANSDUCER

This is a Continuation, of application Ser. No. 633,844 filed Nov. 20, 1975 now abandoned.

BACKGROUND OF THE INVENTION

1. Field of the Invention

The present invention relates to a transducer for magneto-elastic stress measurement. The transducer is of the well known type having a core of magneto-elastic material provided with coils to generate a magnetic flux in the core and to sense the flux alterations which occur when the core is subjected to stress by a mechanical force.

SUMMARY OF THE INVENTION

According to the invention, the transducer has a holder to which the core which is formed of at least one plate is firmly attached, and the holder can be attached to the measuring object. The core may be a single plate attached to the holder at four symmetrically opposite points, or may be a cross having four arms which are welded to a frame of magnetic material welded to the holder, so that the frame forms a return path for the flux. The holder may also be in the form of a casing of magnetic material arranged to protect the core and coils and to serve as a magnetic return path for the flux. For applications where disturbing magnetic fields may occur in the measuring object, the casing is preferably made of non-magnetic material and provided with a frame of magnetic material as a return path for the flux.

The transducer is primarily intended for use as a load indicator for trucks but can also be used in other fields. It is intended to be attached to the object to be measured for stress. The transducer is preferably attached by means of welding, but other methods of attachment are also feasible, such as glueing.

BRIEF DESCRIPTION OF THE DRAWINGS

In the accompanying drawings,

FIGS. 1a and 1b show an embodiment of the transducer in which the core comprises a single, whole piece.

FIGS. 2a and 2b show a cruciform core attached to a holder.

FIGS. 3a and 3b show one half of a dividable winding bobbin for a cruciform core.

FIG. 4 shows the cross of FIGS. 3a, 3b attached to a holder.

FIGS. 5a, 5b and 5c show an embodiment wherein the coils and the core are made separately.

FIGS. 6a and 6b show a transducer in which both the core and the holder are made from a single metal sheet.

FIGS. 7a, 7b and 7c show a transducer in which the holder is in the form of a protective casing.

FIG. 7a shows this transducer from below (with the bottom removed), FIG. 7b in section along the line A—A in FIG. 7a, and FIG. 7c from above.

DESCRIPTION OF THE PREFERRED EMBODIMENTS

Figure 7B:
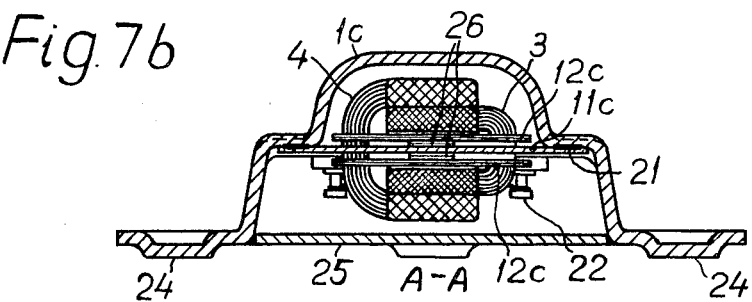

The transducer according to FIGS. 1a and 1b comprises a holder 1 supporting the core 2 of the transducer with coils 3 and 4. The holder is shown here as comprising four supports 5 held together by stays 6. The holder may be made in one piece or composed of the four supports and the four stays welded together, for instance. The drawing is only an example of how the holder may be designed. Many other embodiments are feasible. The important point is that the holder can easily be attached to a base, that the core is easily secured in the holder, preferably by means of welding, and that there is room for the windings. In the embodiment shown, the core consists of a single circular plate attached to the support 5 of the holder by welding at four points 7. The core has four holes 8 for the coils and the coils are arranged in two planes perpendicular to each other and to the surface of the plate. The attachment points 7 lie symmetrically in relation to the planes of the coils. One of the windings is connected in a known manner to an alternating voltage source 9 having a suitable frequency and the other is connected to a measuring device 10.

FIGS. 2a and 2b show a square holder 1a, provided with four supports 5a. The core of the transducer is here in the form of a symmetrical cross with four arms 11 attached by their ends to the holder by means of welding. The holder will therefore form a return path for the fluxes in the core. However, the return of the fluxes can be facilitated by welding a frame 1' of the transformer plate to the holder either above or below the measuring cross.

FIGS. 3 and 4 show how the windings are applied on the transducer core according to FIG. 2a. A plate 12, shown in FIGS. 3a and 3b, of insulating material has such outer contours that it can be placed inside the holder 1. It has four slots 13, open to the outside. One such plate is placed on each side of the cross and directed so that the slots are located over the openings between the arms 11 of the cross. The coils 3 and 4 are then wound on as shown in FIG. 4, after which the ends of the cross are secured to the holder.

It is important that the plates 12 and the coils 3, 4 applied thereon are either completely free from the measuring cross 11 or are only in mechanical contact with the cross at one very limited point. This can be achieved by means of central elevations 26 on the plates 12, facing inwardly (FIG. 3 and FIG. 7b), which are preferably glued to the measuring cross at this point. This ensures against any additional contact which could produce hysteresis and also facilitates the winding since the plates and the cross thus constitute a coherent unit.

Figure 9:
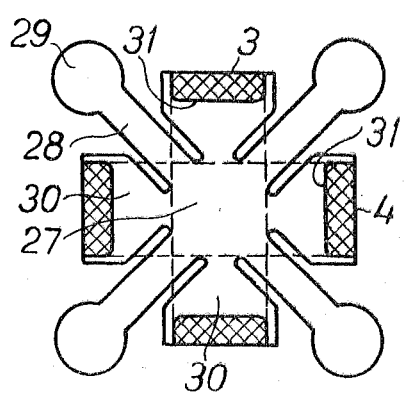
FIGS. 9 and 10 show different embodiments of a bobbin stamped or etched from a plate.
Figure 10:
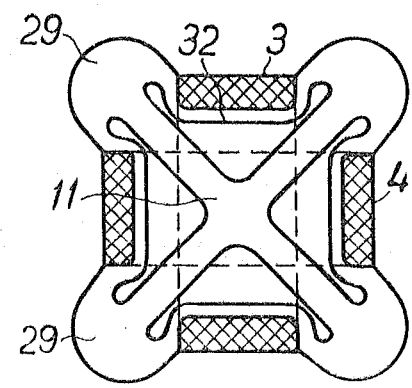

FIGS. 9 and 10 show other solutions to the problem of hysteresis-free bobbins. In both cases the measuring cross and the bobbin are manufactured as one unit of magnetic plate either by stamping or etching. According to FIG. 9 the bobbin is composed of four protrusions 30 from the central part 27 of the measuring cross, symmetrically placed between the cross arms 28. The outer ends of the protrusions have preferably U-formed slots 31 for the windings 3 and 4. According to FIG. 10 the bobbin is composed of four narrow, preferably U-formed strips 32 which are completely free from the sensing part of the cross and connected to the cross only at the four enlarged ends 29, which are to be firmly welded to the holder directly or via a magnetic return frame. Both types of combined measuring cross and bobbin have to be enameled except on the enlarged end surfaces to be welded to the holder.

FIGS. 5a–5c show a transducer in which both the coils and the core are made separately. The coils 3 and 4 are manufactured individually, one coil being given such dimensions that it can be fitted inside the other. The winding 3 is placed perpendicular to and inside the winding 4 as shown in FIGS. 5a and 5c. Two strips of metal 14 and 15 are placed in a cross through the windings as shown in FIG. 5a. The metal strips with windings are attached in a holder 1b of the type shown in FIG. 5b by welding the ends of the strips 14, 15 to the corners of the holder by spot welds 16, as shown in FIG. 5c. The strips should be mechanically prestressed when being attached.

The characteristic feature of the transducer according to the invention, that the core may consist of a single sheet of metal, enables the core and the holder to be manufactured in one piece, starting with a flat sheet as shown in FIGS. 6a and 6b. Four holes 20 are provided for the windings, placed symmetrically. A cross 18 is pressed from the flat sheet 17, raised above the flat surface to form an upper flat surface 19 at a certain level above the original flat surface of the plate and so that the holes 20 are located in the angles between the four arms of the cross. This flat surface 19 and the cross portions between the holes then provide the area where measurement is performed. The two holes for each coil are located opposite each other, which considerably facilitates winding.

The transducer according to FIGS. 6a, 6b may also be manufactured by punching the cross 18 separately and welding it onto the flat plate 17. The coils can then be wound onto the cross 18 before it is attached to the plate 17.

Figure 7C:
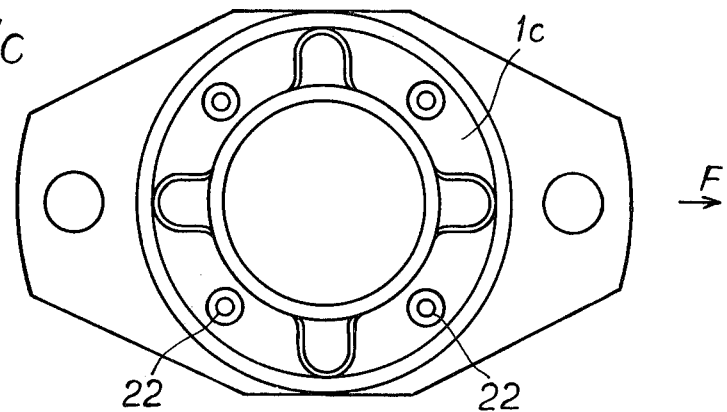

FIGS. 7a–7c show a transducer in which the holder 1c is designed as a cup-shaped casing, normally of magnetic material, protecting the core 11c and windings 3, 4. The core 11c consists of a single plate in the form of a symmetrical cross having four arms. On each side of the cross is a plate 12c of insulating material, of substantially the same design as is shown in FIG. 3. The two insulating plates 12c form a bobbin for the windings 3 and 4. FIG. 7b shows that the plates 12 are provided with a central elevation 26 so that they are only in contact with the measuring cross at one point. The casing 1c is provided with a shoulder 21 to which the ends of the measuring cross (core) 11c are welded and the casing thus serves as a magnetic return path for the flux. For applications where disturbing magnetic fields may occur in the measuring object, the casing is preferably made of non-magnetic material provided with a frame of magnetic material as a return path for the magnetic flux. The casing 1c is provided with four lead-ins 22 for connection leads to the windings 3, 4.

The casing 1c has two attachment lugs 23 placed diametrically, each provided with an elevation 24 on the lower side, where the transducer is intended to be secured to the measuring object, for example by spot welding. The elevations 24 facilitate attachment to the measuring object and also eliminate contact between the measuring object and other parts of the transducer which might cause hysteresis.

The transducer casing 1c may suitably be surrounded by an outer protective cover (not shown). This protective cover should be in direct contact with the transducer casing only at said elevations 23, where the protective cover and the transducer casing are preferably welded together. Both thermal and impact stresses are then taken up directly by the measuring object and do not directly affect the transducer. The space between the transducer casing and the protective cover may suitably be filled with a water-repellent, thermally insulating material having little rigidity, in order to avoid undesired force transmission.

The transducer casing is provided with a sealed bottom 25 which has negligible force-transmitting ability. This bottom may be made of rubber, for instance, in which case it is preferably attached to the transducer casing by glueing or vulcanizing. It may also consist of a (preferably corrugated) metal membrane. Another possibility is to use a metal bottom which is elastically joined to the transducer casing by means of a rubber insert which is glued or vulcanized to the casing and the bottom.

Figure 8:
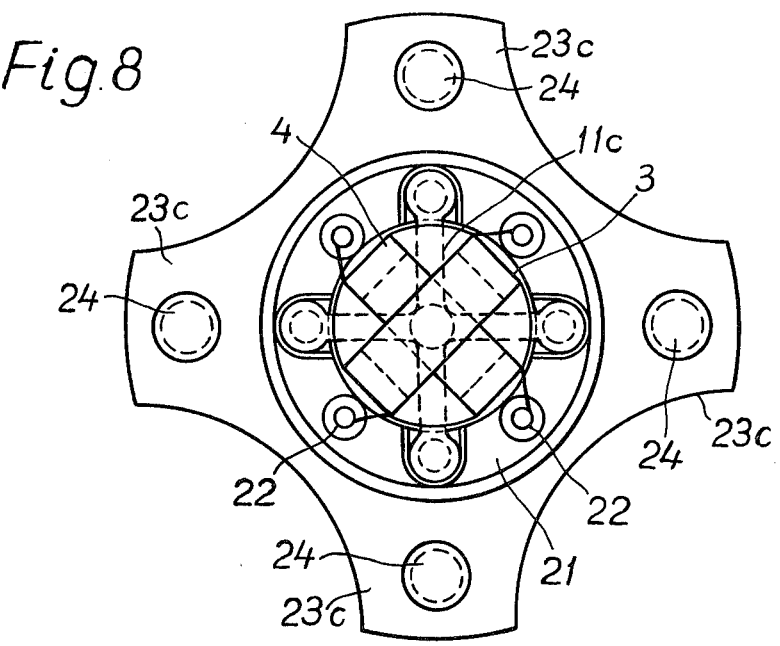
FIG. 8 shows a transducer substantially the same as that shown in FIGS. 7a–7c but designed for measuring the difference between two orthogonal stresses.

The transducer shown in FIGS. 7a–7c is intended for measuring stress only in the pull-push direction indicated by the arrow F (FIG. 7c). The embodiment shown in FIG. 8 also permits measurement of the difference between the stresses in two directions lying perpendicular to each other. For this purpose the transducer is provided with four attachment lugs 23c but does not otherwise differ from the embodiment shown in FIGS. 7a–7c.

We claim:

1. A magneto-elastic transducer for measuring strain in a mechanically loaded object, comprising:
    a core of magneto-strictive material including windings for generating a magnetic flux in the core and for sensing the changes in the flux which occur when the core is affected by mechanical forces, said core being made of a single plate in the form of a cross with four mutually perpendicular arms, said arms being joined together at one of their respective ends, the other ends being provided with enlarged end surfaces;
    a cup-shaped casing including a shoulder for supporting said enlarged end surfaces, said end surfaces being fastened to the shoulder by welding, said cup-shaped casing being provided with at least one pair of force-transmitting lugs for fastening the transducer to the loaded object.

2. A magneto-elastic transducer as in claim 1 wherein said windings are supported by a pair of insulating plates including an elevated portion for supporting said insulating plates core in a point contact relationship with said core to reduce hysteresis.

3. A magneto-elastic transducer as in claim 1 wherein said force-transmitting lugs consist of two oppositely disposed lugs in line with one of the arms of said core.

4. A magneto-elastic transducer as in claim 3 wherein said lugs extend below the bottom of said cup-shaped casing to provide an elevated mounting of said transducer on the loaded object.

5. A magneto-elastic transducer as in claim 1 wherein said force-transmitting lugs consist of four symmetrically arranged lugs respectively aligned with the arms of said core.

6. A magneto-elastic transducer as in claim 1 wherein said casing is made of non-magnetic material and further comprising a frame of magnetic material to provide a return path for the magnetic flux.

7. A magneto-elastic transducer as in claim 1 wherein said cup-shaped casing is made of magnetic material to provide a return path for the flux.

8. A transducer according to claim 1, in which said cup-shaped casing further includes two pairs of force-transmitting lugs, said two pairs of lugs being arranged symmetrically in relation to each other.

* * * * *